(12) United States Patent
Müller

(10) Patent No.: US 6,266,842 B1
(45) Date of Patent: Jul. 31, 2001

(54) WINDSHIELD CLEANING DEVICE WITH LIQUID COLLECTION

(76) Inventor: Hermann-Frank Müller, Lyngsbergstrasse 3a, 53177 Bonn (Bad Godesberg) (DE)

( * ) Notice: Subject to any disclaimer, the term of this patent is extended or adjusted under 35 U.S.C. 154(b) by 0 days.

(21) Appl. No.: 09/307,333

(22) Filed: May 6, 1999

(30) Foreign Application Priority Data

May 6, 1998 (DE) ............................................. 198 20 220

(51) Int. Cl.[7] ................................. B60S 1/46; B60S 1/48
(52) U.S. Cl. ........................... 15/250.01; 239/284.1; 239/303; 15/250.02
(58) Field of Search ...................... 15/250.01, 250.02, 15/250.03, 250.04, 250.001, 250.05; 239/284.1, 284.2, 306, 303, 304, 310, 130

(56) References Cited

U.S. PATENT DOCUMENTS

| | | | | |
|---|---|---|---|---|
| 3,738,575 | * | 6/1973 | Somer | 239/284.1 |
| 3,846,867 | * | 11/1974 | Bryant | 15/250.02 |
| 3,888,412 | * | 6/1975 | Lindo | 15/250.01 |
| 5,946,763 | * | 9/1999 | Egner-Walter et al. | 15/250.02 |
| 6,024,803 | * | 2/2000 | Buchanan, Jr. et al. | 239/284.1 |

FOREIGN PATENT DOCUMENTS

| | | | | |
|---|---|---|---|---|
| 2330488 | * | 1/1975 | (DE) | 239/284.1 |
| 2700926 | * | 7/1978 | (DE) | 15/250.001 |
| 3243173 | * | 5/1984 | (DE) | 239/284.1 |
| 3501896 | * | 7/1986 | (DE) | 15/250.01 |
| 3734130 | * | 4/1989 | (DE) | 15/250.03 |
| 2552041 | * | 3/1985 | (FR) | 15/250.01 |
| 191454 | * | 8/1986 | (JP) | 15/250.01 |
| 175242 | * | 7/1987 | (JP) | 15/250.01 |

* cited by examiner

*Primary Examiner*—Gary K. Graham
(74) *Attorney, Agent, or Firm*—Robert W. Becker & Associates

(57) ABSTRACT

A windshield cleaning device for a windshield of a motor vehicle has a reservoir containing a cleaning liquid for washing the windshield. A pump is connected to the reservoir for pumping the cleaning liquid onto the windshield. A collecting device is provided for collecting and returning excess sprayed cleaning liquid, spray water, and rain water into the reservoir. A heat exchanger is provided for heating the cleaning liquid pumped by the pump by heat energy derived from the cooling water cooling the motor of the motor vehicle. A control circuit measures at least one temperature that can be the ambient temperature or the temperature of the cleaning liquid and allows pumping of the cleaning liquid onto the windshield only above a set temperature limit. A metering device automatically introduces an alcohol mixture, and optionally surface-active agents, into the cleaning liquid based on the measured temperature.

12 Claims, 4 Drawing Sheets

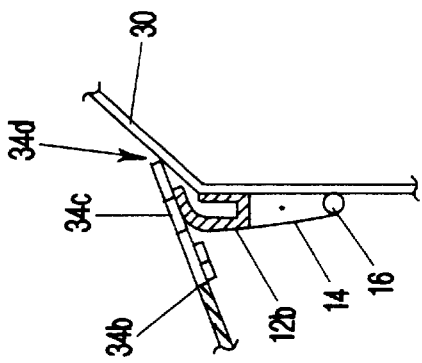
FIG-2
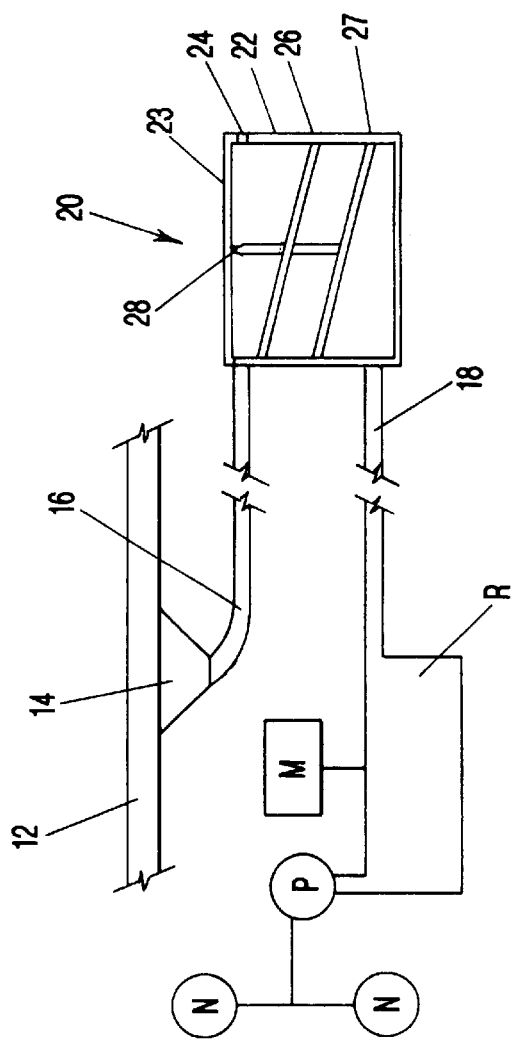
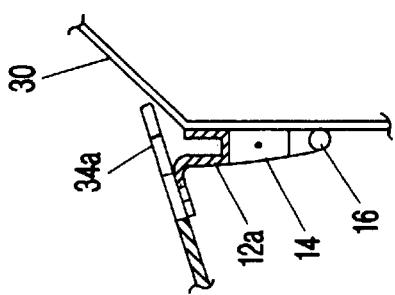
FIG-3a
FIG-3b

WINDSHIELD CLEANING DEVICE WITH LIQUID COLLECTION

BACKGROUND OF THE INVENTION

The present invention relates to a windshield cleaning device for motor vehicles which, under consideration of the ambient temperature, provides for the best possible clear view through the windshield.

It is already known to provide the cleaning liquid for cleaning the windshield with surface-active substances, in order to be able to remove soot, grease, lubricants, and, optionally also dust and salt from the windshield. The use of a water-based cleaning liquid at low, especially negative, ambient temperatures (Celsius scale) is possible by employing mixtures with alcohol whereby the alcohol/water composition must be matched to the expected ambient temperature. Since the ambient temperature, however, changes during the course of the day, in general, to a more positive temperature value, while, on the other hand, the wind chill from driving causes on the windshield a temperature drop, the composition with respect to the amount of alcohol must be such that, in the least favorable case, freezing of the cleaning liquid on the windshield and especially in the spray nozzles is safely prevented.

For a fast removal of snow and ice from the windshield of a vehicle that is parked outdoors, especially after an unpredicted snowstorm or temperature drop, it is favorable when heated cleaning liquid can be used. For this purpose, it is known to use electrical heating elements that are operated, in general, by electric energy taken from the motor vehicle battery. Another possibility for heating the cleaning liquid is the use of a heat exchanger which will heat the cleaning liquid with the aid of the hot cooling water circulating in the running engine so that the relatively low amount of energy stored in the battery can be saved.

With the aforementioned measures, it is possible within a certain amount of time to provide a clean windshield and thus a clear view. However, the expenditure with regard to the cleaning liquid and in the cold seasons of the year also with regard to the added alcohol mixture, are considerable.

It is therefore an object of the present invention to provide a windshield cleaning device with which the amount of cleaning liquid as well as the required amount of alcohol or alcohol mixture (commercial windshield wiper liquids contain a water/alcohol mixture) can be considerably reduced without having a detrimental effect with regard to the quality of the cleaning action.

SUMMARY OF THE INVENTION

As a solution to this object it is suggested to provide a control circuit for controlling pumping of the cleaning liquid such that it occurs only above a certain minimum temperature value. The temperature value may relate to the ambient temperature and/or the actual cleaning liquid temperature. Furthermore, a device for collecting the excess sprayed cleaning liquid, water spray, and rain water and their return into a reservoir as well as a metering device for introducing an alcohol mixture into the cleaning liquid are provided. The metering device meters the alcohol mixture or alcohol according to the measured temperature values, whereby the alcohol mixture or alcohol can be introduced into the reservoir or directly into the supply line for the cleaning liquid extending from the reservoir into the spray nozzles. In general, cleaning liquid in the context of the invention is water with additives such as alcohol or other liquids with antifreeze action and surface-active or cleaning agents.

BRIEF DESCRIPTION OF THE DRAWINGS

The object and advantages of the present invention will appear more clearly from the following specification in conjunction with the accompanying drawings, in which:

FIG. 2 shows schematically an embodiment of the inventive device according to FIG. 1 including a filter device reservoir, pump, and spray nozzles;

FIG. 3a shows a cross-section of the inventive device according to FIG. 1;

FIG. 3b shows a constructive variant in cross-section in a view analog to FIG. 3a;

DESCRIPTION OF THE PREFERRED EMBODIMENTS

The present invention will now be described in detail with the aid of several specific embodiments utilizing FIGS. 1 through 5.

Figure 1:
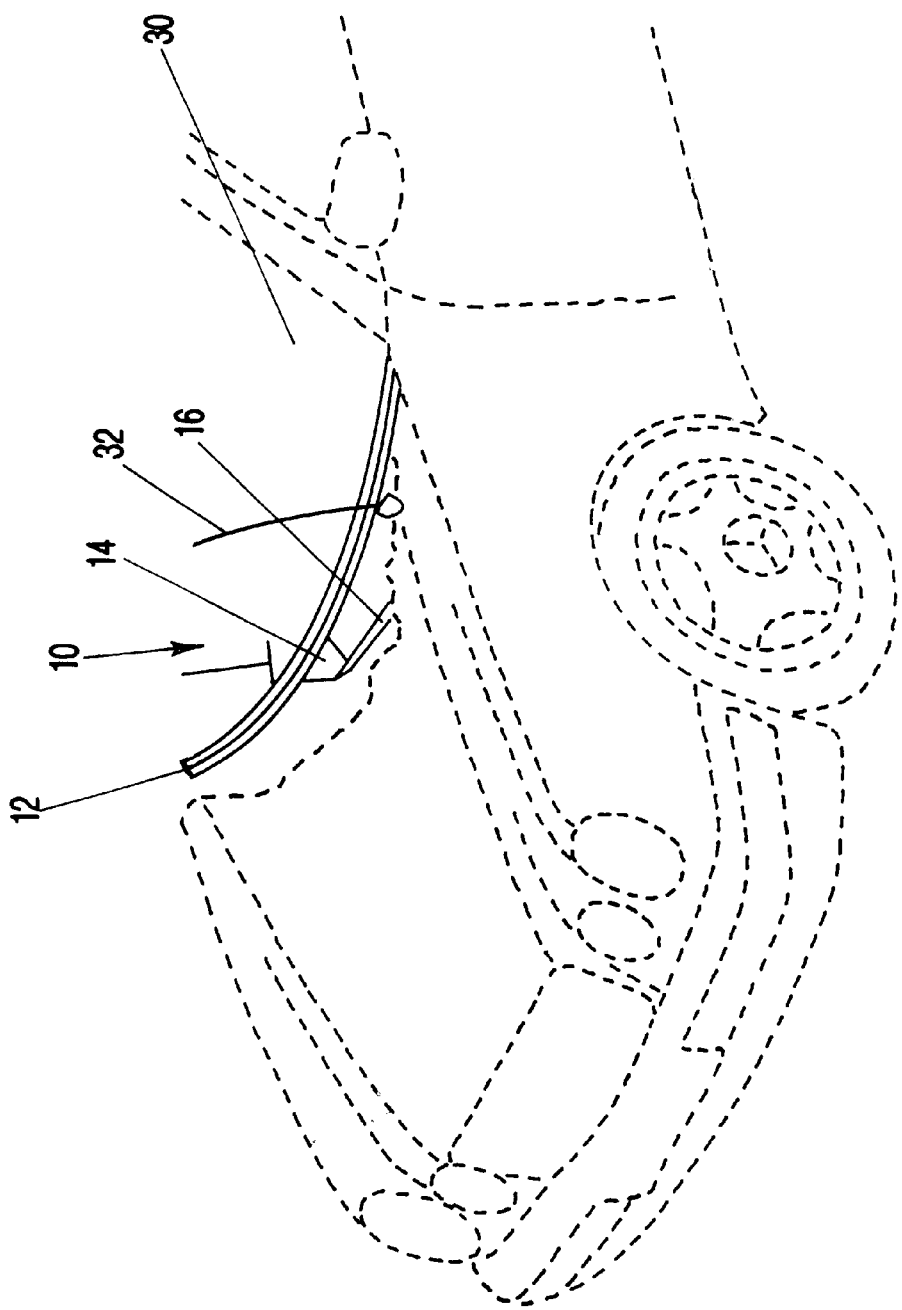
FIG. 1 shows the arrangement of the inventive device collecting especially excess sprayed cleaning liquid, at a motor vehicle.

FIG. 1 shows the arrangement of the inventive collecting device 10 for collecting the excess sprayed cleaning liquid originally contained in and pumped out of the reservoir R of the inventive windshield cleaning device. FIG. 1 shows the preferred mounting location on a motor vehicle. It is understood that in this manner it is possible to also collect water such as rain or melted snow and water that is sprayed onto the motor vehicle by passing vehicles when roads are wet. Since the water collected by collecting trough 12 of the collecting device 10 no longer has the quality as tap water usually filled into the reservoir R, it is guided from the collecting trough 12 by a tapered connecting member 14, which is connected to the bottom portion of the collecting trough 12, for example, at its center, into an inlet tube 16 connected to a liquid cleaning device 20 (see FIG. 2). The liquid cleaning device 20 is comprised of a container 22 of any desired shape and size, matched to the space available within the engine compartment. The container 22 is tightly closed by a lid 23. The inlet tube 16 coming from the collecting trough 12 is connected tightly to an edge portion of the container 22 by a non-represented connector. Opposite the connector for the inlet tube 16, an overflow opening 24 is provided at the container 22. Of course, given certain constructive and size specification, the overflow opening 24 can also be provided at any other location of the container 22. The overflow opening 24 can be provided with a check valve so that soiling of the container 22 from the exterior is prevented. In the container 22 a coarse filter 26 and below it a fine filter 27 are provided. Both are preferably comprised of micro fiber fleece material (non-woven) that is able to remove, in addition to small dirt particles, also calcium deposits. The two filters 26, 27 are positioned within the container 22 in a downwardly slanted direction away from the connector of the inlet tube 16. They are both removable, for example, by gripping a projection 28 that is centrally positioned on the filters. The removable filters 26, 27 thus can be easily removed and cleaned when needed. At the bottom of the container 22 in one of the sidewalls a connecting tube 18 is provided that connects the container 22 to the reservoir R of the windshield cleaning device, respectively, to its fill socket. The connecting tube 18 may also be provided with a non-represented check valve so that an overfilling of the reservoir R is prevented and excess liquid can flow via the overflow opening 24 out of the system. The reservoir R has a pump P for pumping the cleaning liquid to the spray nozzles N (FIG. 2).

In FIGS. 3a and 3b cross-sections of the collecting device 10 are represented which differ only in the design of their water collecting troughs 12a, 12b. In FIG. 3a the collecting trough 12a is embodied for motor vehicles having a hood 34a for the engine compartment that is provided with slots in the vicinity of the windshield while the hood 34b of FIG. 3b is closed so that the collecting trough 12b must be provided with a guide member 34c resting tightly at this cover 34b and provided with a slot 34d extending along the length of the windshield 30 for allowing water to pass through. This slot 34d must be dimensioned such that no large dirt particles can penetrate which would disturb the water flow from the collecting trough 12b. A cover can be provided that keeps large dirt particles out of the collecting device while allowing liquid to pass through.

Since the water collected in the collecting trough 12b, because of its different origin, no longer has the quality of the water in the reservoir R, it is necessary to add to the thus collected water a certain amount of alcohol mixture and optionally surface-active agents whereby the amount to be added depends on the difference of the actual composition to the initially determined values, respectively, to the set point values. This addition can also take into account changing temperature conditions, i.e., the amount of alcohol can be adjusted in order to prevent freezing. The amount of surface-active agents and alcohol in the reservoir R can be, for example, automatically electronically determined based on varying viscosity or by optical means. The amount of surface-active agents and/or alcohol needed can then be automatically added by a metering device M and a respective inlet into the reservoir R. Metering devices are known to the artisan. Mixing with the cleaning liquid in the reservoir R is achieved simply by the vibrations and movements of the motor vehicle during driving. In this manner, manual supplementing of the cleaning liquid by surface-active agents and alcohol mixtures, i.e., manual refilling of the reservoir, is no longer necessary. If necessary, an additional control of the contents of surface-active agents and alcohol in the cleaning liquid can be achieved by providing a feed means opening into the tube between the pump (P) 56 and the spray nozzle N.

Figure 4:
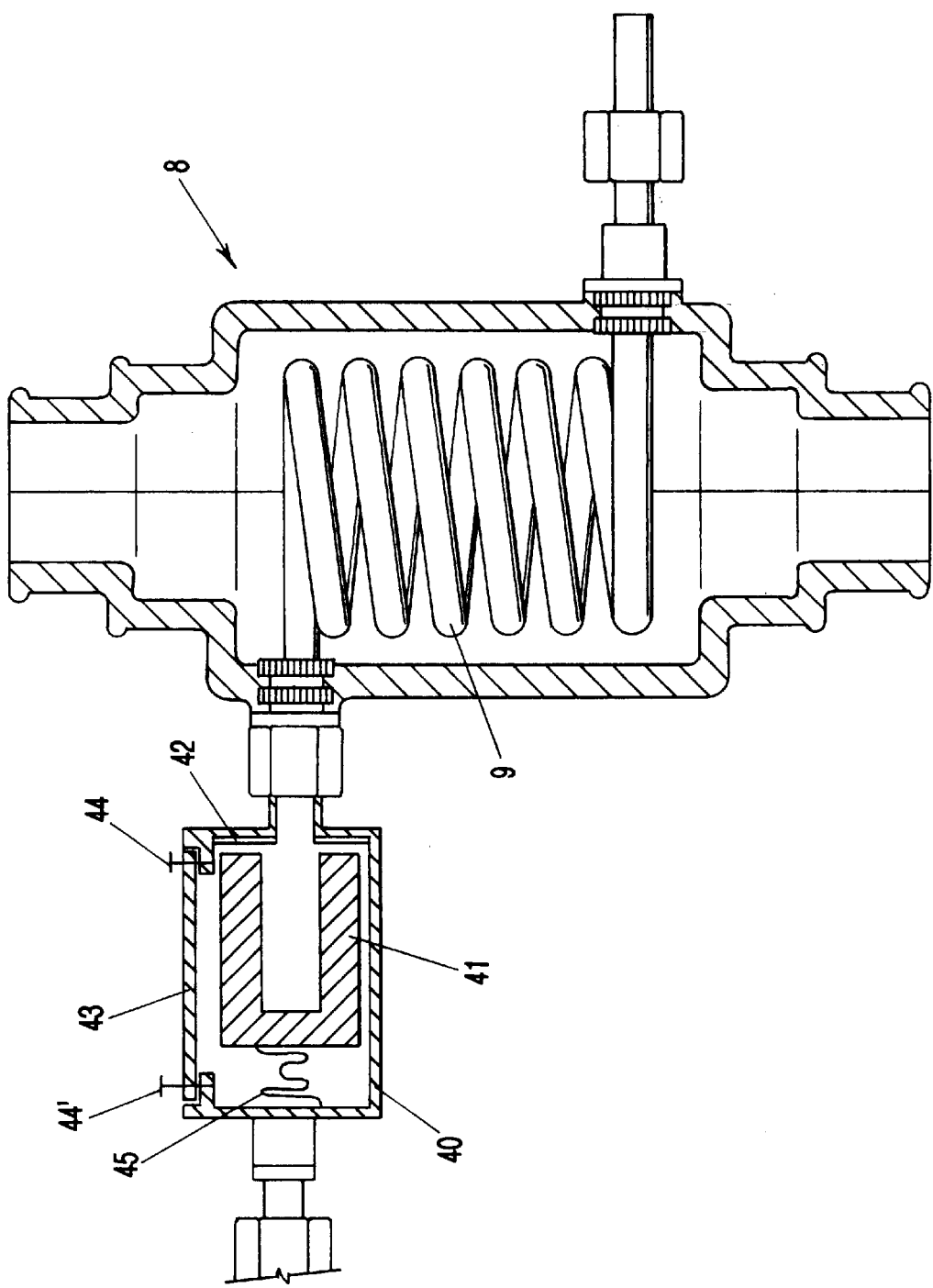
FIG. 4 shows a filter device mounted upstream of the heat exchanger.

Since as the basic component for the cleaning liquid tap water is commonly used which may be very hard (high calcium content), a filter 41, for example, a micro fiber non-woven or fleece, should be used before the water enters the heat exchanger 8, where it is heated, so that calcium deposits can be removed and the inner walls of the spiral 9 of the heat exchanger 8 can be maintained free of calcium deposits. This prevents a decrease of the heat exchanging efficiency. Such a filter device is represented in FIG. 4 and comprises a filter housing 40 in which a filter 41 is secured by a spring 45 pressing it against a seal 42. The cover 43 of the filter housing 40 is removable so that the filter 41 can be easily exchanged when it is clogged by calcium deposits. An arrangement of the heat exchanger 8 as close as possible to the spray nozzle N will ensure a correspondingly higher cleaning liquid temperature.

Figure 5:
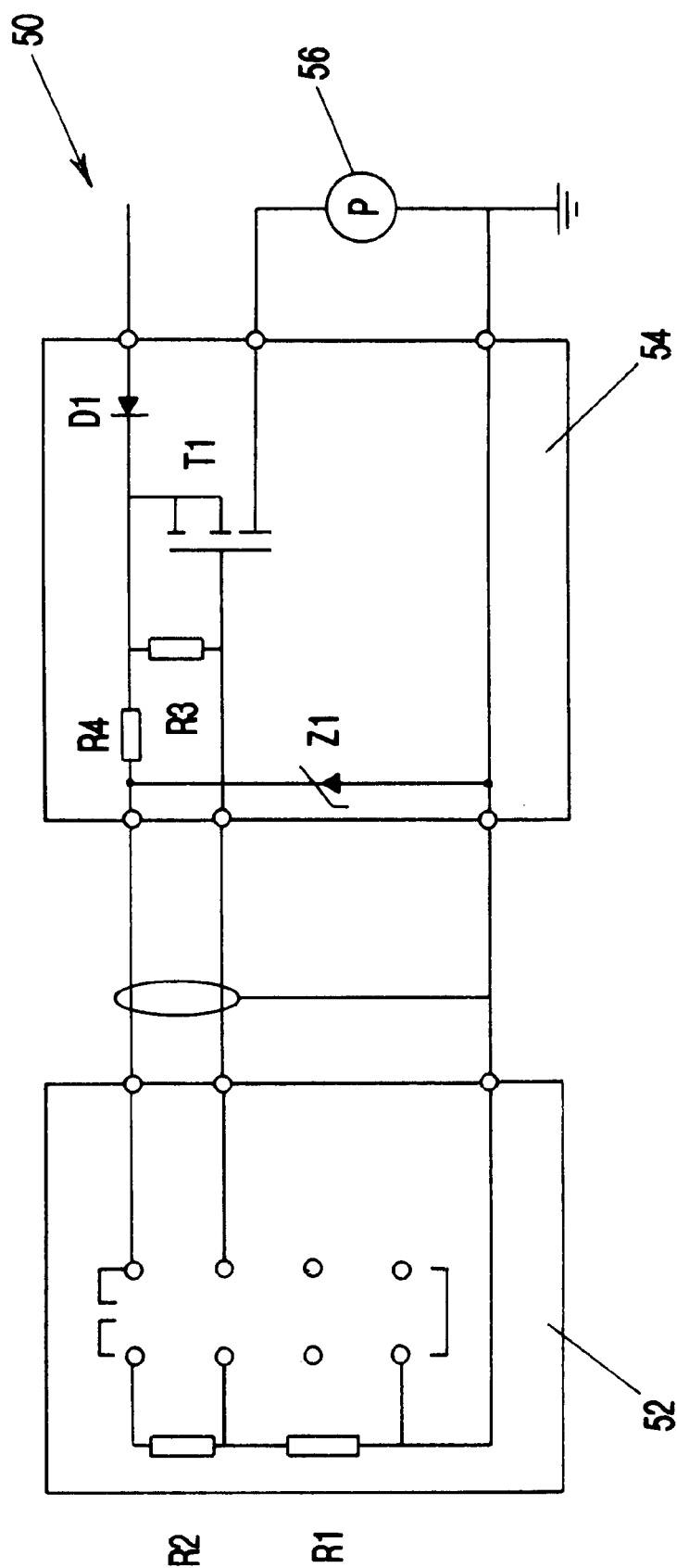
FIG. 5 shows a control circuit for the inventive device.

In order to prevent that the windshield cleaning device is actuated especially when the windshield 30 is very cold due to low ambient temperature and the cleaning liquid would freeze on the windshield 30, a control circuit is provided, shown in FIG. 5. It comprises a sensor 52 which is preferably mounted at the bottom portion of the steering column (the coldest location of the motor vehicle) or, for example, at the lower corner of the windshield 30 at a spacing to the rubber seal of the windshield 30. When placed too close to the windshield, the sensor 52 would provide erroneous temperature readings of the windshield 30. The control circuit can be set to a switch point of, for example, +4/+2° C. so that the pump 56 (shown at P in FIG. 2) can be actuated (switch 54) for the cleaning process only when a sufficiently high windshield temperature and/or cleaning liquid temperature to be measured in the reservoir and/or at the heat exchanger has been reached.

The sensor 52 is comprised of two resistors $R_1$ and $R_2$. The switch 54 comprises, in addition to the resistors $R_3$ and $R_4$, a diode $D_1$, a Zehner diode $Z_1$, and a low-ohmic (low resistance) transistor $T_1$. The conventional voltage of 12 V available in motor vehicles is used for operation.

The time and frequency of the actuation of the windshield cleaning device in combination with the windshield wipers 32, in general, differs from individual to individual. While one driver is already irritated by a single insect smashed on the windshield 30, other drivers will not be irritated even by a great number of insects on the windshield because they experience the movement of the windshield wipers for removal of the insects as more disturbing. Accordingly, many motor vehicles have the option of a manual actuation of the windshield cleaning device together with the windshield wipers for a short period of time that is usually sufficient for cleaning the windshield. However, the possibility of an automatic actuation of the windshield wipers in conjunction with the windshield cleaning device, for example, based on the presence of a dust coating or, optionally, an adjustable degree of soiling of the windshield by insects and/or an automatic change of the pivoting speed of the windshield wipers 32, for example, based on the size and/or number of raindrops is also possible. It is expedient in this context when, after actuation of the windshield cleaning device using hot or warm water, an additional cleaning step with cold water follows which is enriched with surface-active agents or similar additives because only in this manner is it possible to completely remove the remains of insects that are still present on the windshield after cleaning with hot or warm water.

The specification incorporates by reference the disclosure of German priority document 198 20 220.2 of May 6, 1998.

The present invention is, of course, in no way restricted to the specific disclosure of the specification and drawings, but also encompasses any modifications within the scope of the appended claims.

What is claimed is:

1. A windshield cleaning device for a windshield of a motor vehicle, said device comprising:

a reservoir containing a cleaning liquid for washing the windshield;

a pump connected to said reservoir for pumping the cleaning liquid via spray nozzles onto the windshield;

a collecting device for collecting and returning excess sprayed cleaning liquid, spray water, and rain water into said reservoir;

a heat exchanger for heating the cleaning liquid pumped by said pump by heat derived from the cooling water cooling the motor of the motor vehicle;

a control circuit for measuring at least one temperature selected from the ambient temperature and the cleaning liquid temperature and allowing pumping of the cleaning liquid onto the windshield only above a set temperature limit for the at least one temperature; and a metering device for automatically introducing an alcohol mixture into the cleaning liquid based on the composition thereof and taking into account the at least one measured temperature.

2. A device according to claim 1, wherein said control circuit comprises at least one temperature sensor and a switch.

3. A device according to claim 2, wherein said at least one sensor is mounted at a bottom portion of the steering column of the motor vehicle.

4. A device according to claim 2, wherein said at least one sensor is mounted on the windshield.

5. A device according to claim 2, further comprising a liquid cleaning device, wherein said collecting device comprises a collecting trough, having a tapered connecting member and an inlet tube connected to said tapered connecting member, and wherein said collecting trough is connected by said inlet tube to said liquid cleaning device.

6. A device according to claim 5, wherein said collecting trough has a cover covering said collecting trough such that dirt particles are retained while excess sprayed cleaning liquid, spray water, and rain water can pass through.

7. A device according to claim 5, wherein said liquid cleaning device comprises:

a container tightly closed by a lid;
a coarse filter and a fine filter mounted in said container;
a connector to which said inlet tube is connected;
an overflow to allow excess liquid to drain.

8. A device according to claim 7, wherein said coarse filter and said fine filter are removable from said container.

9. A device according to claim 1, further comprising a filter device mounted between said pump and said heat exchanger.

10. A device according to claim 1, wherein said metering device comprises an automatic feed device introducing automatically surface-active agents into the cleaning liquid, contained in said reservoir or in the connecting tube between said reservoir and said spray nozzles, to meet set concentration values.

11. A device according to claim 1, further comprising a switching device actuating automatically speed-adjustable windshield wipers for a combined operation with said windshield cleaning device.

12. A device according to claim 11, wherein said switching device adjusts a speed of the windshield wipers according to size and number of raindrops.

* * * * *

UNITED STATES PATENT AND TRADEMARK OFFICE
CERTIFICATE OF CORRECTION

PATENT NO. : 6,266,842 B1
DATED : July 31, 2001
INVENTOR(S) : Müller

It is certified that error appears in the above-identified patent and that said Letters Patent is hereby corrected as shown below:

<u>Title page,</u>
Item [54], should read as follows:
-- [54] Title: WINDSHIELD CLEANING DEVICE --

Signed and Sealed this

Fourteenth Day of May, 2002

*Attest:*

*Attesting Officer*

JAMES E. ROGAN
*Director of the United States Patent and Trademark Office*